United States Patent
O'Hare

(10) Patent No.: US 8,321,166 B2
(45) Date of Patent: Nov. 27, 2012

(54) METHODS AND SYSTEMS FOR WIRELESS PLATFORM ATTITUDE DETERMINATION

(75) Inventor: James K. O'Hare, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 330 days.

(21) Appl. No.: 12/726,264

(22) Filed: Mar. 17, 2010

(65) Prior Publication Data
US 2011/0231133 A1    Sep. 22, 2011

(51) Int. Cl.
*G01C 17/38*    (2006.01)
*G06F 19/00*    (2011.01)

(52) U.S. Cl. ............ 702/92; 342/357.23; 701/470; 701/472; 702/96

(58) Field of Classification Search ........... 702/92–96, 702/141–145, 150, 152, 158, 190; 701/454, 701/469, 470, 472; 342/357.23
See application file for complete search history.

(56) References Cited

U.S. PATENT DOCUMENTS

| | | | |
|---|---|---|---|
| 5,543,804 A * | 8/1996 | Buchler et al. | 342/357.23 |
| 5,948,044 A | 9/1999 | Varley et al. | |
| 2002/0029110 A1 | 3/2002 | Fukuda et al. | |
| 2010/0256939 A1 * | 10/2010 | Borenstein | 702/96 |

FOREIGN PATENT DOCUMENTS

| | | |
|---|---|---|
| EP | 1154281 A1 | 11/2001 |
| WO | WO9608730 A1 | 3/1996 |

OTHER PUBLICATIONS

International Search Report and Written Opinion—PCT/US2011/028703, ISA/EPO—Jul. 12, 2011.

* cited by examiner

*Primary Examiner* — John H Le
(74) *Attorney, Agent, or Firm* — Sam Talpalatsky; Nicholas J. Pauley; Jonathan T. Velasco

(57) ABSTRACT

Wireless platform attitude information such as pitch, roll and heading are disclosed. Attitude estimates can be made by using orthogonally mounted gyroscopes. Attitude estimates can be also made by determining the direction of arrival of signals and comparing the direction of arrival of the signals with the position of the transmitters and the position of the receiver. The attitude estimates can be then combined to determine "real time" attitude information.

28 Claims, 6 Drawing Sheets

Body Rates          Change in Attitude
(pitch, roll, heading)

(a)          (b)

U.S. 8,321,166 B2

METHODS AND SYSTEMS FOR WIRELESS PLATFORM ATTITUDE DETERMINATION

FIELD

Certain embodiments of the present disclosure generally relate to wireless communications and, more particularly, to methods and systems for determining attitude information about a wireless platform.

BACKGROUND

Wireless devices, such as mobile phones, personal digital assistants (PDA's), navigational devices, and the like, are often able to generate absolute position data by using, for example, Global Positioning System (GPS) signals or other geo-location signals. Unfortunately, the benefits of such data are not fully realized because attitude information (e.g., pitch, roll and heading) about the wireless device is lacking.

As an example, a handheld navigation device can be considered that provides navigation information such as a map on the device's display. It may be also desirable to provide a user of the device with an arrow on the map pointing in a desired travel direction. The arrow cannot be generated accurately without the wireless device having information about its present orientation or attitude. In this instance, a lack of accurate information about the heading of the device will prevent the device from generating an accurate directional arrow that could help guide a user to a desired location.

SUMMARY

Certain embodiments of the present disclosure provide a method for determining attitude information about a wireless platform. The method generally includes measuring one or more rotational body rates of the platform, estimating the direction of arrival of signals received at the platform, and calculating the attitude information based on the measured rotational body rates and the estimated direction of arrival of the one or more signals.

Certain embodiments of the present disclosure provide an apparatus for determining attitude information about a wireless platform. The apparatus generally includes one or more gyroscopes configured to measure one or more rotational body rates of the apparatus, an estimator configured to estimate the direction of arrival of one or more signals, and a processor configured to calculate the attitude information about the apparatus based on the measured rotational body rates and the direction of arrival of the one or more signals.

Certain embodiments of the present disclosure provide an apparatus for wireless communications. The apparatus generally includes means for measuring, with one or more gyroscopes, one or more rotational body rates of the apparatus, means for estimating a direction of arrival of one or more signals received at the apparatus, and means for calculating attitude information based on the measured rotational body rates and the direction of arrival of the one or more signals.

Certain embodiments of the present disclosure provide a computer-program storage apparatus for determining attitude information about a wireless platform comprising a memory unit having one or more software modules stored thereon and the one or more software modules being executable by one or more processors. The one or more software modules generally include code for measuring, with one or more gyroscopes, one or more rotational body rates of the wireless platform, code for estimating a direction of arrival of one or more signals received at the wireless platform, and code for calculating the attitude information based on the measured rotational body rates and the direction of arrival of the one or more signals.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
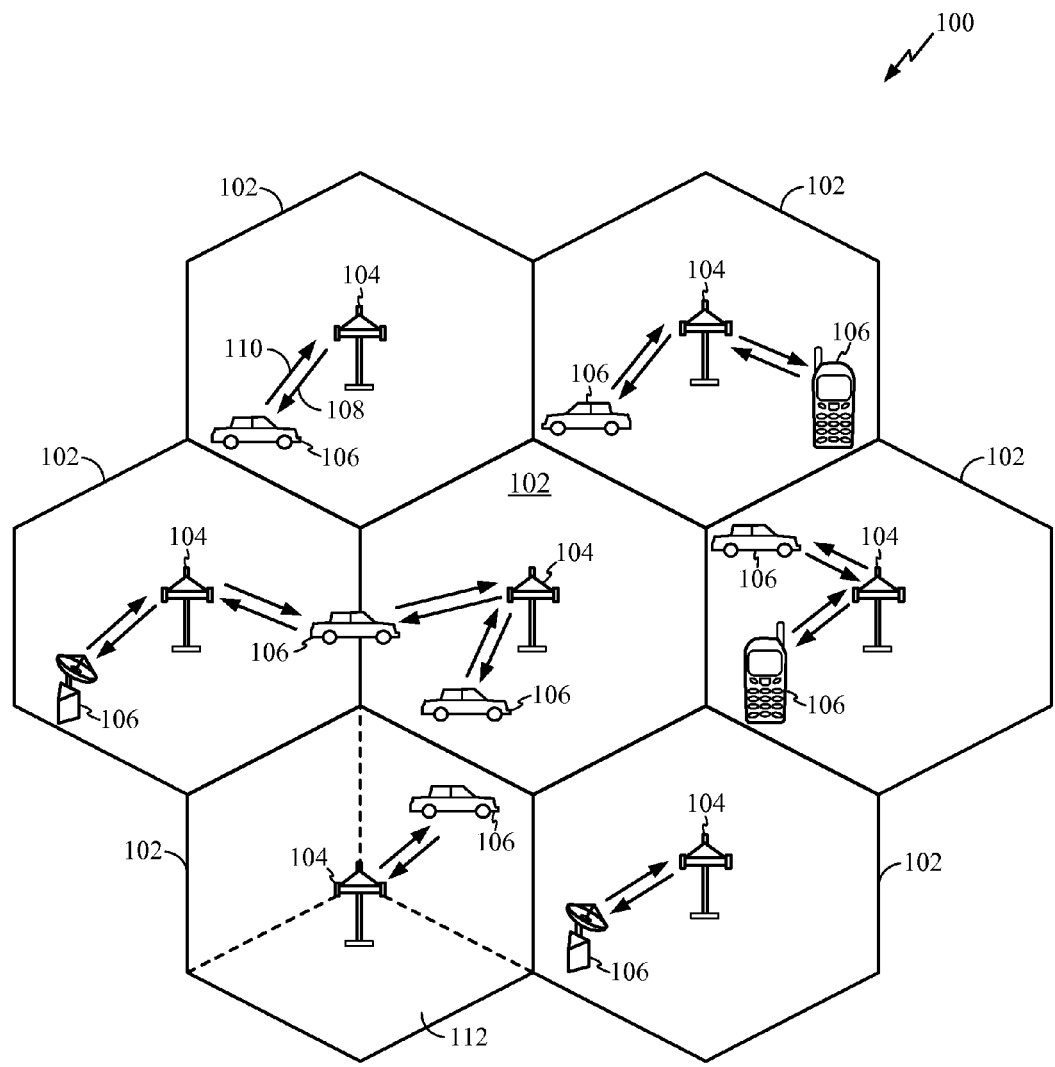
FIG. 1 illustrates an example wireless communication system in accordance with certain embodiments of the present disclosure.

Various embodiments of the disclosure are described more fully hereinafter with reference to the accompanying drawings. This disclosure may, however, be embodied in many different forms and should not be construed as limited to any specific structure or function presented throughout this disclosure. Rather, these embodiments are provided so that this disclosure will be thorough and complete, and will fully convey the scope of the disclosure to those skilled in the art. Based on the teachings herein one skilled in the art should appreciate that the scope of the disclosure is intended to cover any embodiment of the disclosure disclosed herein, whether implemented independently of or combined with any other embodiment of the disclosure. For example, an apparatus may be implemented or a method may be practiced using any number of the embodiments set forth herein. In addition, the scope of the disclosure is intended to cover such an apparatus or method which is practiced using other structure, functionality, or structure and functionality in addition to or other than the various embodiments of the disclosure set forth herein. It should be understood that any embodiment of the disclosure disclosed herein may be embodied by one or more elements of a claim.

The word "exemplary" is used herein to mean "serving as an example, instance, or illustration." Any embodiment described herein as "exemplary" is not necessarily to be construed as preferred or advantageous over other embodiments.

Although particular embodiments are described herein, many variations and permutations of these embodiments fall within the scope of the disclosure. Although some benefits and advantages of the preferred embodiments are mentioned, the scope of the disclosure is not intended to be limited to particular benefits, uses or objectives. Rather, embodiments of the disclosure are intended to be broadly applicable to different wireless technologies, system configurations, networks and transmission protocols, some of which are illustrated by way of example in the figures and in the following description of the preferred embodiments. The detailed description and drawings are merely illustrative of the disclosure rather than limiting, the scope of the disclosure being defined by the appended claims and equivalents thereof.
Exemplary Wireless Communication System The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain embodiments of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP LTE, or Evolved UTRA.

The teachings herein may be incorporated into (e.g., implemented within or performed by) a variety of wired or wireless apparatuses (e.g., nodes). In some embodiments, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more embodiments taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some embodiments, the node is a wireless node. Such wireless node may provide, for example, connectivity for or to a network (e.g., a wide area network such as the Internet or a cellular network) via a wired or wireless communication link.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system. Alternatively, signals may be sent and received between the base stations 104 and the user terminals 106 in accordance with SC-FDMA technique. If this is the case, the wireless communication system 100 may be referred to as a SC-FDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
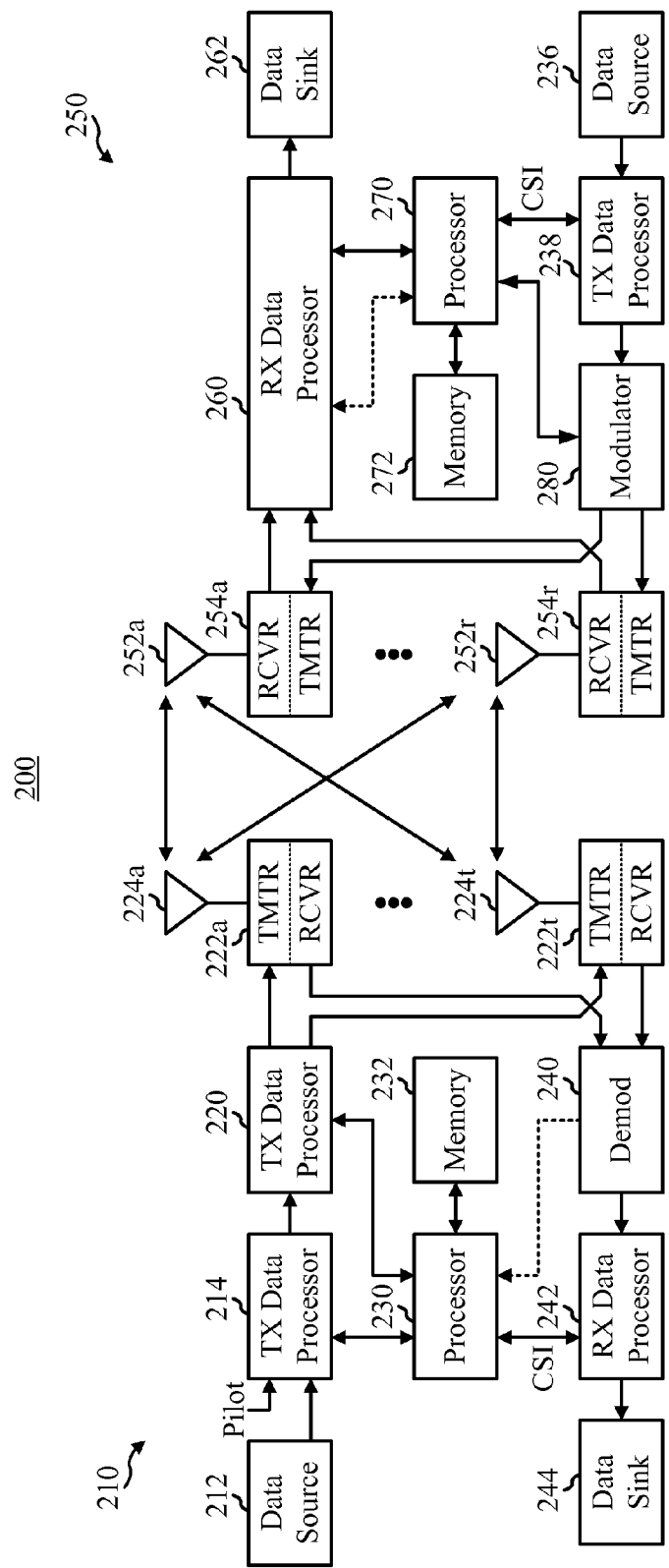
FIG. 2 illustrates a schematic diagram of wireless devices in accordance with certain embodiments of the present disclosure.

FIG. 2 illustrates an example wireless network environment 200 in accordance with certain embodiments set forth herein. Wireless network environment 200 depicts one base station 210 and one mobile device 250 for sake of brevity. However, it is contemplated that system 200 can include one or more base stations and/or one or more mobile devices, wherein additional base stations and/or mobile devices can be substantially similar or different from illustrated base station 210 and illustrated mobile device 250 described herein. In addition, it is contemplated that base station 210 and/or mobile device 250 can employ the systems, techniques, configurations, embodiments, embodiments, and/or methods described herein to facilitate wireless communication between them.

At base station 210, traffic data for a number of data streams is provided from a data source 212 to transmit (TX) data processor 214. In certain embodiments, each data stream can be transmitted over a respective antenna and/or over multiple antennas. TX data processor 214 formats, codes, and interleaves the traffic data stream based on a particular coding scheme selected for that data stream to provide coded data.

The coded data for each data stream can, for example, be multiplexed with pilot data using orthogonal frequency division multiplexing (OFDM) techniques. Additionally or alternatively, the pilot symbols can be code division multiplexed (CDM) with coded data, frequency division multiplexed (FDM), or time division multiplexed (TDM). The pilot data is typically a known data pattern that is processed in a known manner and can be used at mobile device 250 to estimate channel response or other communication parameters and/or characteristics. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding and modulation for each data stream can be determined by instructions performed or provided by processor 230.

The modulation symbols for the data streams can be provided to a TX MIMO processor 220, which can further process the modulation symbols. TX multiple-input multiple-output (MIMO) processor 220 then provides $N_T$ modulation symbol streams to $N_T$ transmitters (TMTR) 222a through 222t. In certain embodiments, TX MIMO processor 220 applies certain multi-antenna techniques, such spatial multiplexing, diversity coding or precoding (i.e., beamforming, with weights being applied to the modulation symbols of the data streams and to the antenna from which the symbol is being transmitted).

Each transmitter 222 receives and processes a respective modulation symbol stream to provide one or more analog signals, and further conditions (e.g., amplifies, filters, upconverts, etc.) the analog signals to provide a modulated signal suitable for transmission over the MIMO channel. Further, $N_T$ modulated signals from transmitters 222a through 222t are transmitted from $N_T$ antennas 224a through 224t, respectively.

At mobile device 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, downconverts, etc.) a respective signal, digitizes the conditioned signal to provide samples, and further processes the samples to provide a corresponding "received" symbol stream.

A receive (RX) data processor 260 can receive and process the $N_R$ received symbol streams from $N_R$ receivers 254 based on a particular receiver processing technique to provide $N_T$ "detected" symbol streams. RX data processor 260 can demodulate, de-interleave, and decode (and perform other processing for) each detected symbol stream to recover the traffic data for the data stream, and provide the traffic data to a data sink 262. In certain embodiments, for mobile device 250, the processing by RX data processor 260 can be complementary to that performed by TX MIMO processor 220 and TX data processor 214 at base station 210.

A processor 270 can periodically determine which precoding matrix to utilize as discussed above. Further, processor 270 can formulate a reverse link message comprising a matrix index portion and a rank value portion. The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from mobile device 250 are received by $N_R$ antennas 224, conditioned by respective $N_R$ receivers 222, demodulated by a demodulator 240, and processed by a RX data processor 242 to extract the reverse link message transmitted by mobile device 250, and provide the reverse link message to a data sink 244. Further, processor 230 can process the extracted message to determine which precoding matrix to use for determining the beamforming weights.

Processors 230 and 270 can direct (e.g., control, coordinate, manage, etc.) operation at base station 210 and mobile device 250, respectively. Respective processors 230 and 270 can be associated with memory 232 and 272 that store program codes and data. Processors 230 and 270 can also perform computations to derive frequency and impulse response estimates for the uplink and downlink, respectively. All "processor" functions can be migrated between and among process modules such that certain processor modules may not be present in certain embodiments, or additional processor modules not illustrated herein may be present.

Memory 232 and 272 (as with all data stores disclosed herein) can be either volatile memory or nonvolatile memory or can include both volatile and nonvolatile portions, and can be fixed, removable or include both fixed and removable portions. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink™ DRAM (SLDRAM), and direct Rambus™ RAM (DRRAM). Memory 232 and 272 of the certain embodiments is intended to comprise, without being limited to, these and any other suitable types of memory.

Figure 3:
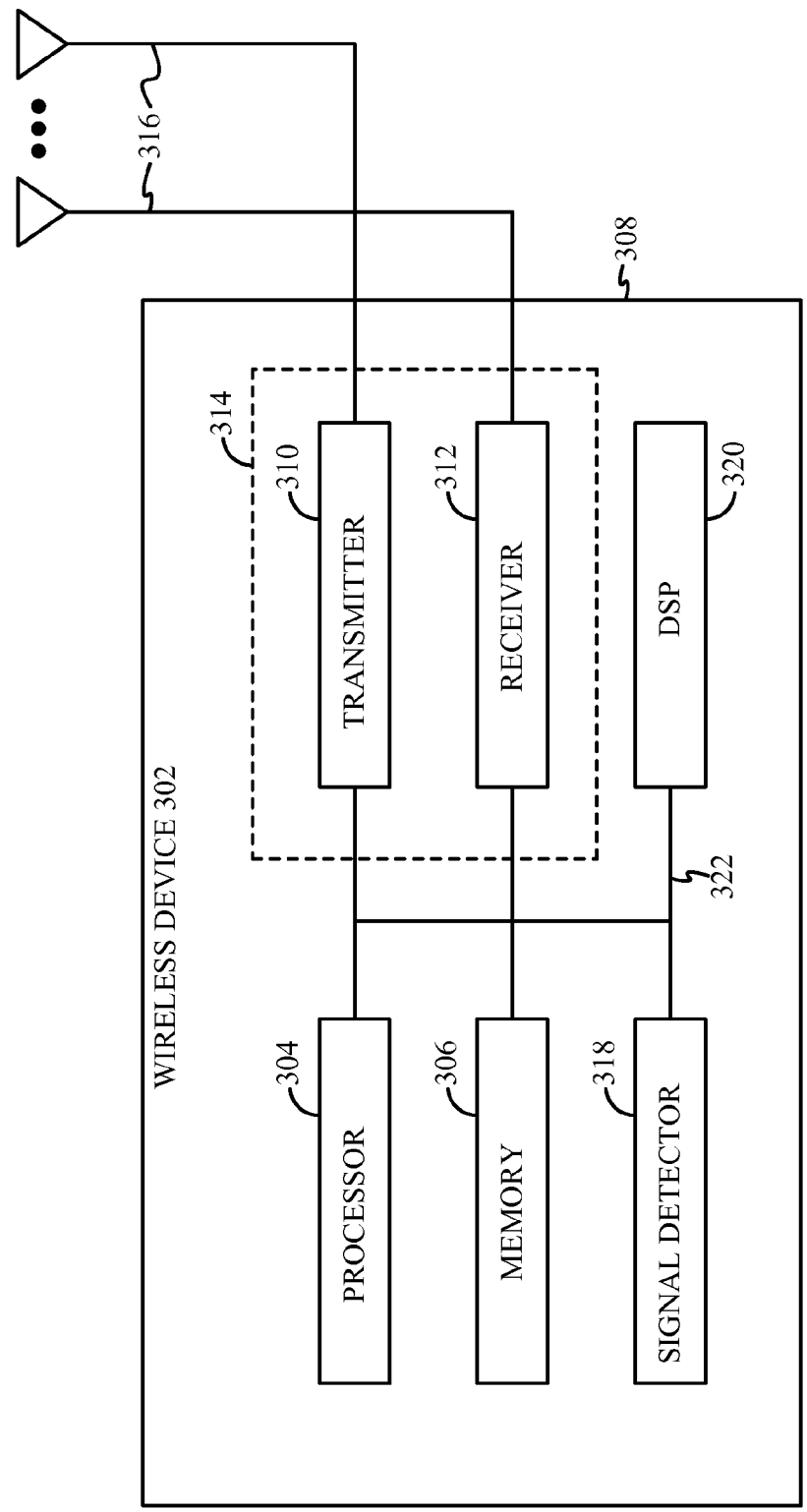
FIG. 3 illustrates various components that may be utilized in a wireless device in accordance with certain embodiments of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Exemplary Wireless Platform Attitude Determination

Certain embodiments of the present application may allow accurate attitude information (e.g., pitch, roll and heading) to be determined at a wireless platform, such as a user equipment (UE) or other wireless device.

A wireless platform with accurate attitude information may allow for augmented reality and rich virtual presence applications. For example, with accurate attitude information, applications can accurately display virtual objects in the same angular position as real world objects. Applications with accurate attitude information may also feature moving maps and virtual horizons that self orient to the angular position of the wireless platform.

A secondary benefit of having accurate attitude information about the wireless platform is that the attitude information may be combined with acceleration data measured by one or more accelerometers and with other sensor data to provide an inertial navigation capability when the Global Positioning System (GPS) or other geo-location data are not available (e.g., in the case of indoor or dense city environments).

Figure 4:
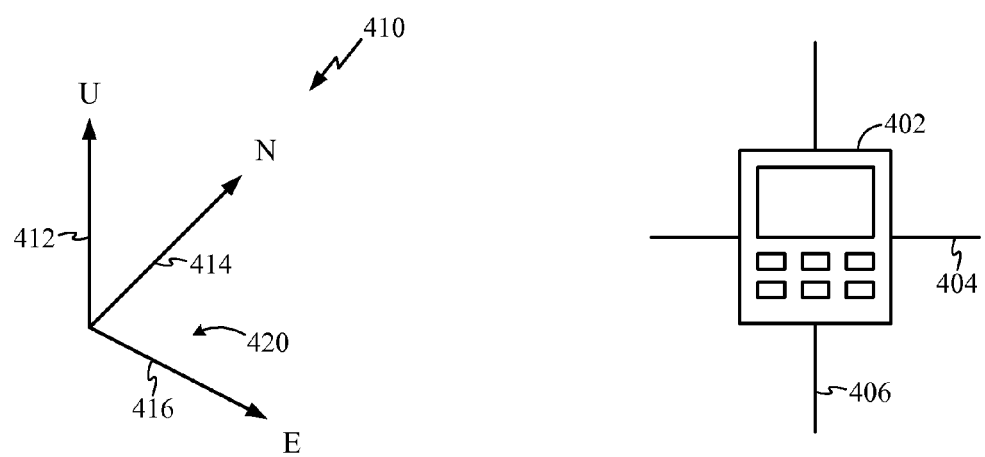
FIG. 4 illustrates an example of wireless platform whose attitude information is being determined in accordance with certain embodiments of the present disclosure.

FIG. 4 illustrates an example of wireless platform 402 and a local coordinate system. The attitude of the wireless platform 402 may be defined by the angular position of three orthogonal axes. In this case, the orthogonal axes may be: a pitch axis 404 that may extend from the left side of the wireless platform 402 to the right side of the wireless platform 402; a roll axis 406 that may extend from the bottom of the wireless platform 402 to the top of the wireless platform 402; and heading (or yaw) axis (not shown in FIG. 4) that may extend vertically through the center of the wireless platform 402.

Also shown in FIG. 4 is a North East Up (NEU) coordinate system 410. The NEU coordinate system 410 may comprise an Up axis 412 that may extend from the center of the Earth upward, with an origin at the Earth's surface. The NEU coordinate system 410 may also comprise a North axis 414 that may extend from South to North and an East axis 416 that may extend from West to East. The North axis and the East axis at the Earth's surface may define, according to a geodetic reference model, a North East Plane 420 tangential to the Earth's surface.

According to a common convention, the heading of the wireless platform 402 may represent the angle formed between the North axis 414 and the roll axis 406 when the roll axis 406 is projected down onto the North-East plane 420. According to this convention, the heading can be from 0 degrees to 360 degrees. The pitch of the wireless platform 402 may represent the angle formed between the roll axis 406 and the North-East plane 420 at the point of intersection. According to this convention, the pitch of the wireless platform 402 can be +90 degrees (i.e., down 90 degrees to up 90 degrees). The roll of the wireless platform 402 may represent the angle formed between the pitch axis 404 and the North-East plane 420 at the point of intersection. According to this convention, the roll of the wireless platform 402 can be +180 degrees (i.e., left 180 degrees to right 180 degrees).

It is also to be understood that there are many other coordinate systems that may be used to define the attitude of the wireless device 402. An Euler rotation may be utilized to convert attitude information from one coordinate system to another. There are many commonly used coordinate systems, such as Earth Centered Earth Fixed (ECEF) and North East Down (NED). The geodetic model for the Earth may also vary. Again, the Euler rotation may be used to convert the attitude information from a first geodetic reference frame (e.g., the World Geodetic System of 1984 (WGS 84)) to a second geodetic reference frame (e.g., the North American Datum of 1927 (NAD 27)).

Certain embodiments of the present disclosure support methods and apparatus for determining attitude information about the wireless platform 402. The wireless platform 402 may be, for example, the mobile device 106 of the wireless system 100 illustrated in FIG. 1, the mobile device 250 from FIG. 2, and/or the wireless device 302 illustrated in FIG. 3. The attitude information of the wireless platform 402 may, for example, comprise the pitch, roll and heading angles.

Figure 5:
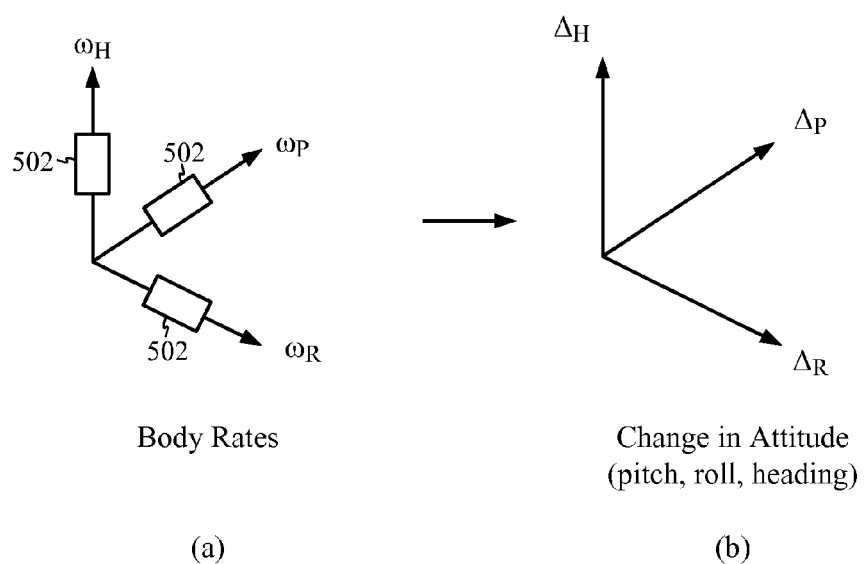
FIG. 5 illustrates an example of determining the attitude of the wireless platform based on silicon gyroscope measurements in accordance with certain embodiments of the present disclosure.

In one embodiment of the present disclosure, the attitude of the wireless platform 402 may be determined by utilizing tri-axis silicon gyroscopes mounted on the wireless platform. FIG. 5 illustrates an example of how the attitude of the wireless platform may be determined based on the measurements made by three silicon gyroscopes 502 configured to measure body rates. The silicon gyroscopes 502 may be configured to measure rotational body rates $\omega_P$, $\omega_R$ and $\omega_H$ of the wireless device along all three axis (i.e., pitch, roll and heading), as illustrated in FIG. 5A.

The body rates may be integrated over time to determine changes in the attitude of the wireless device, as illustrated in FIG. 5B where variables $\Delta_P$, $\Delta_R$, and $\Delta_H$ represent the changes of pitch, roll and heading, respectively. However, in order to determine the absolute angular position of the wireless platform 402, a starting attitude of the wireless device may need to be determined. In addition, small errors in the measured body rates may build over time, which may eventually make the attitude estimate inaccurate.

Figure 6:
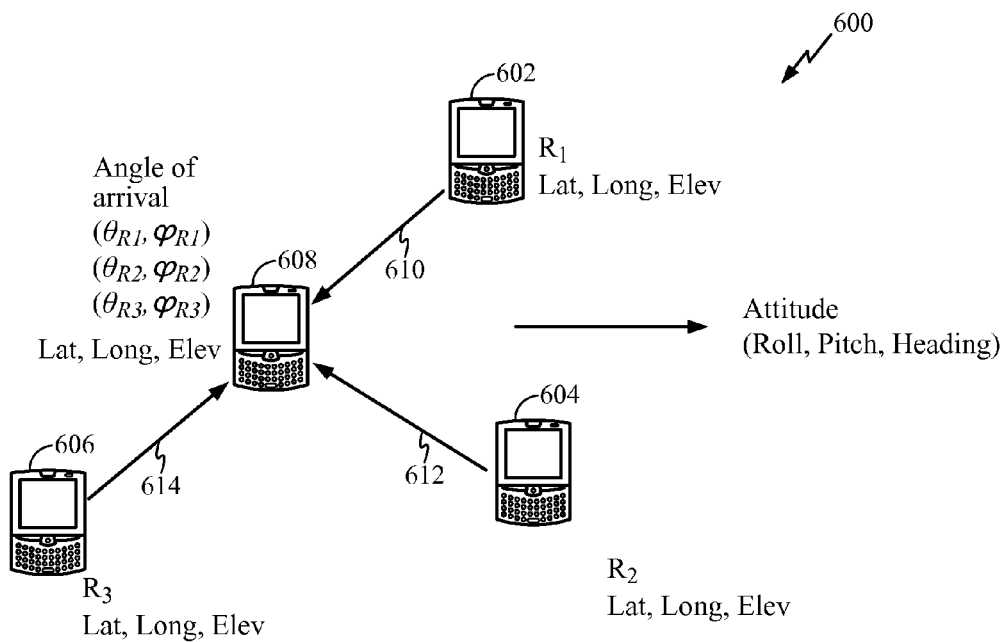
FIG. 6 illustrates an example of determining the attitude of the wireless platform based on directions of arrivals of signals in accordance with certain embodiments of the present disclosure.

In another embodiment of the present disclosure, the attitude information associated with the wireless platform may be determined by measuring directions of arrival of signals transmitted from multiple surrounding radios and by comparing geodetic positions of one or more transmitting radios with a geodetic position of the receiving wireless platform. An example of this approach is illustrated in FIG. 6. Transmitting radios (e.g., peer nodes in an ad hoc network) 602, 604 and 606 may transmit position information (i.e., geodetic positions) to a receiving wireless platform 608. For example, the position information may comprise latitude, longitude, elevation or grid coordinates.

The wireless platform 608 may also determine the position of the transmitting radios 602, 604 and 606 via a database. For example, the radios 602, 604 and 606 may be base stations with known geodetic positions. The wireless platform 608 may comprise a lookup table or it may request the position information from a remote database via a wireless link. The wireless platform 608 may also calculate the position of the transmitter. For example, the radios 602, 604 and 606 may be GPS satellites, and the wireless platform 608 may calculate their position from orbital coefficients stored in a database or received from the satellites.

Directions of arrivals of transmitted signals 610-614 (i.e., angles of arrivals of transmitted signals) may be determined at the platform 608 according to the received signals. Using the determined directions of arrivals and the position of the transmitters, the wireless platform 608 may estimate its attitude. The attitude information may be determined based on either absolute position information (e.g., GPS coordinates) or based on relative position information (e.g., relative position information from radio navigation aids).

With at least three transmitting radios 602-606 being non-coplanar with the wireless platform 608, the attitude of the wireless platform may be determined from the direction of arrival of the signals using vector math. As those skilled in the art will readily appreciate, there are many ways for obtaining the direction of arrival of the transmitted signals 610-614, for example by using array antennas, vector antennas and/or comparing phases of receive signals.

One of the concerns with relying exclusively on this embodiment for determining attitude is that at least three non-coplanar transmitting radios may not be always available. In addition, the calculation burden of measuring direction of arrival and comparing the positions of the transmitters 602-606 with the position of the wireless platform 608 may require some time, which may cause latency in the attitude estimates.

The problems and advantages associated with both aforementioned approaches for determining the attitude of the wireless device may be complementary in many instances. For example, the approach based on silicon gyroscopes may provide very accurate and timely estimates of changes in platform's attitude (i.e., changes of body rates), while errors in the absolute estimate of attitude may slowly build to an unacceptable level. On the other hand, the approach based on directions of arrivals of signals may provide accurate attitude estimates, but these estimates may be often unacceptably latent. Therefore, combining the attitude information obtained from the silicon gyroscope approach with the attitude information obtained from the directions of arrivals of signals approach may provide accurate and timely estimates of the platform's attitude.

In one embodiment of the present disclosure, the combining of attitude information from two aforementioned methods may be based on estimating an attitude error by periodically subtracting (comparing) time-tagged angle of arrival attitude measurements from time-tagged silicon gyroscope attitude calculations. The attitude error may be therefore obtained as:

$$\epsilon = \text{Attitude}_{sg} - \text{Attitude}_{doa}. \quad (1)$$

This gyroscope error may be then continuously subtracted from the silicon gyroscope attitude measurements in "real time" to produce accurate and timely combined attitude information (i.e., corrected attitude information):

$$\text{Attitude}_{combined} = \text{Attitude}_{sg} - \epsilon. \quad (2)$$

As used herein, "real time" may be defined by a maximum speed capability of the electro-mechanics implementing one or more of the disclosed embodiments, or some other speed less than this maximum speed capability. "Real time" may also be defined by a minimum usage speed needed by a user of one or more of the disclosed embodiments, or an application that uses one or more of the disclosed embodiments, in order for the user or the application to function as intended and/or advertised, or some other speed less than or greater than this minimum usage speed.

This embodiment provides a simple way of correcting initial attitude errors as well as gyro bias errors. In other embodiments, the gyroscope errors or direction of arrival errors may be also estimated over time with more complex mathematical models. For example, gyro drift rates or multipath errors may be estimated and appropriate correction models may be used.

Figure 7:
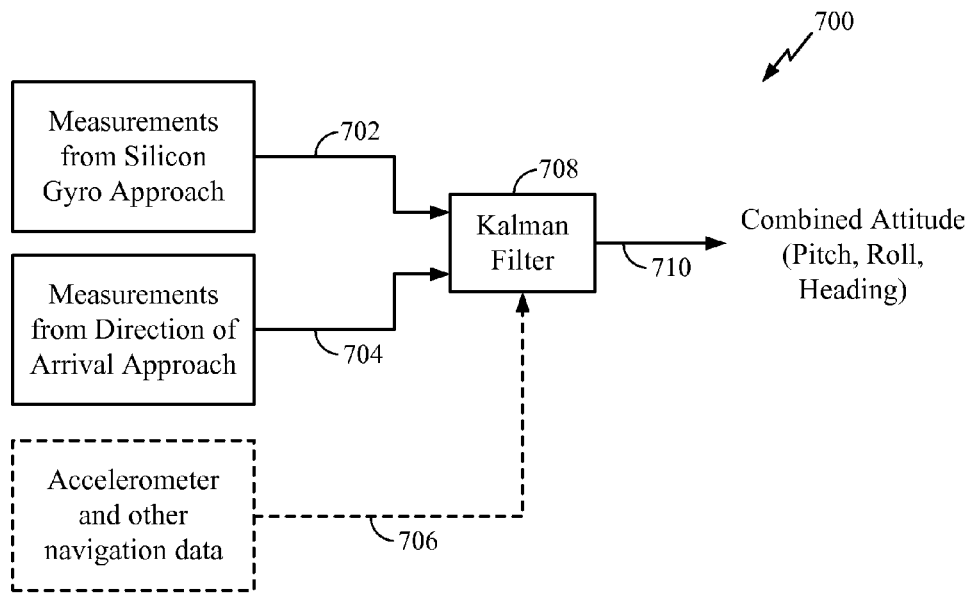
FIG. 7 illustrates an example of applying a Kalman filter for determining the attitude of the wireless platform in accordance with certain embodiments of the present disclosure.

Another way to combine attitude information is with a Kalman filter, as illustrated in FIG. 7. In one embodiment of the present disclosure, attitude measurements 702 from the silicon gyroscope approach may be combined with attitude measurements 704 from the directions of arrival approach using a Kalman filter 708, wherein the Kalman filter may estimate a corrected attitude.

In another embodiment, as illustrated in FIG. 7, acceleration data measured by one or more accelerometers and other navigation data 706 associated with the wireless platform may be provided to the Kalman filter 708 to generate combined or corrected attitude information 710. Other wireless platform state data may be also provided to the Kalman filter to aid in attitude estimation. Positioning data, velocity data and other inertial data may be also provided to the Kalman filter 708 to generate an inertial navigation solution.

Figure 8:
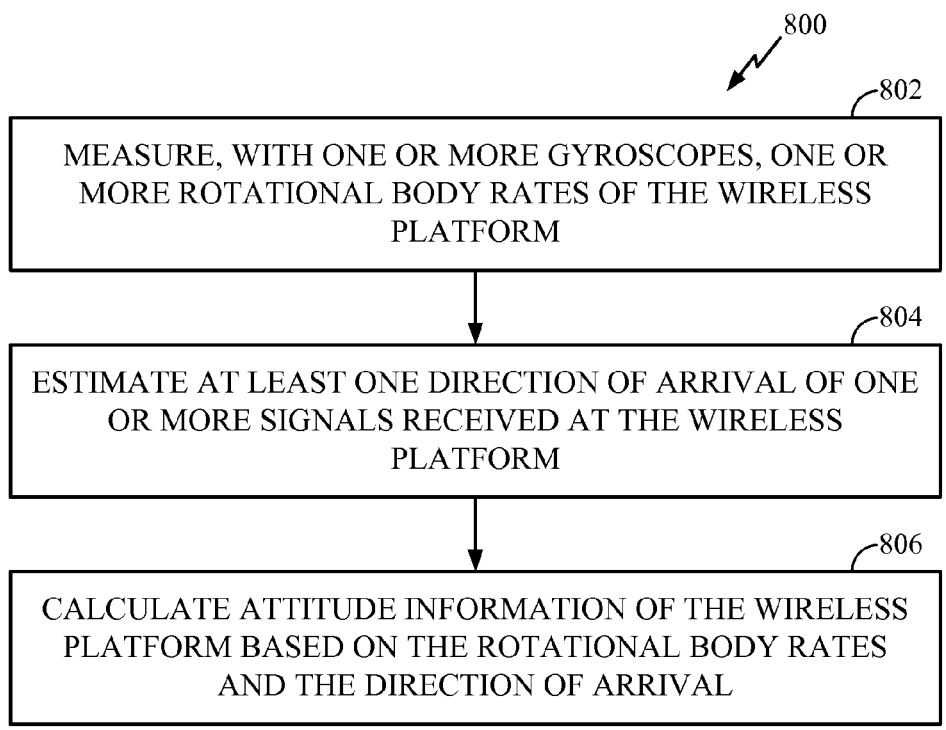
FIG. 8 illustrates example operations for determining the attitude of the wireless platform in accordance with certain embodiments of the present disclosure.

FIG. 8 illustrates example operations 800 for determining an attitude of a wireless platform in accordance with certain embodiments of the present disclosure. At 802, one or more rotational body rates of the wireless platform may be measured using one or more gyroscopes mounted on the wireless platform. At 804, at least one direction of arrival of one or more signals may be estimated at the wireless platform. At 806, attitude information of the wireless platform may be calculated based on the rotational body rates and the direction of arrival.

Figure 8A:
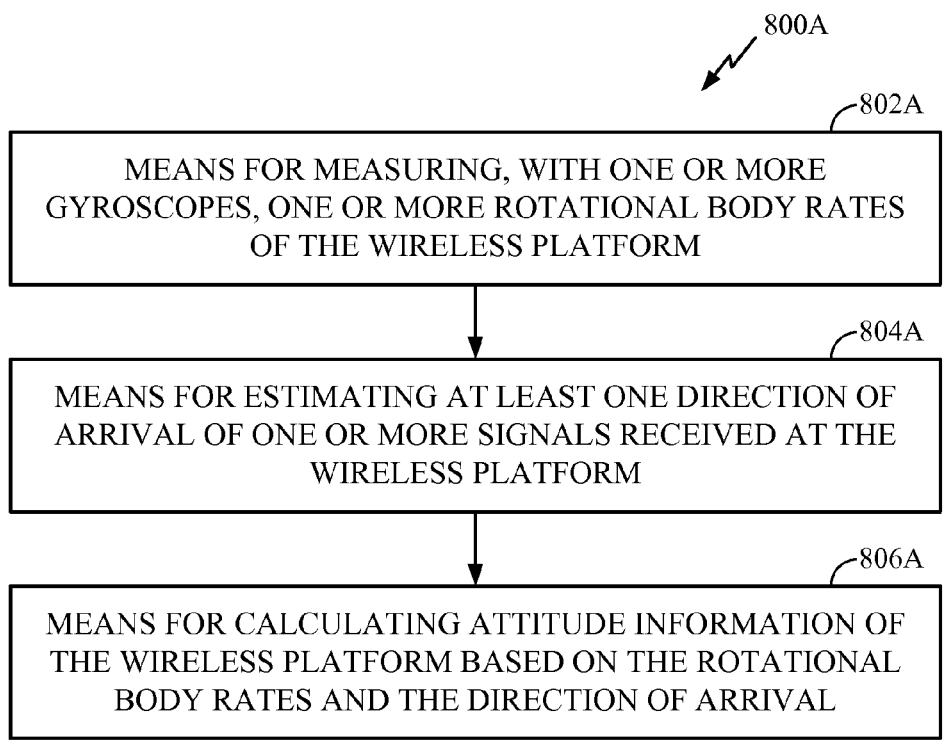
FIG. 8A illustrates example components capable of performing the operations illustrated in FIG. 8.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 800 illustrated in FIG. 8 correspond to components 800A illustrated in FIG. 8A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium or memory unit (one or more devices) that is known in the art. Some examples of storage media or memory units that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain embodiments may comprise a computer program storage device or apparatus for performing the operations presented herein. For example, such a computer program storage unit may comprise a computer readable medium or memory unit having instructions or software modules stored (and/or encoded) thereon, the instructions and/or software modules being executable by one or more processors to perform the operations described herein. For certain embodiments, the computer program product may include packaging material.

Software modules or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method of determining attitude information about a wireless platform, comprising:
measuring, with one or more gyroscopes, one or more rotational body rates of the wireless platform;
estimating a direction of arrival of one or more signals received at the wireless platform;
obtaining a first attitude estimate based on the measured rotational body rates;
obtaining a second attitude estimate based on the direction of arrival;
comparing the first attitude estimate with the second attitude estimate to estimate a gyroscope error; and
combining the gyroscope error with a third attitude estimate to obtain the attitude information.

2. The method of claim 1, wherein the attitude information comprises at east one of: a heading, a pitch, or a roll of the wireless platform.

3. The method of claim 1, wherein the attitude information is calculated by:
processing, using a Kalman filter, the rotational body rates and the direction of arrival of the one or more signals.

4. The method of claim 1, further comprising:
measuring, using one or more accelerometers, acceleration data for the wireless platform; and
processing, using a Kalman filter, the rotational body rates, the direction of arrival and the acceleration data.

5. The method of claim 1, further comprising:
integrating the rotational body rates over time to determine changes in the attitude information.

6. The method of claim 1, wherein estimating the direction of arrival comprises:
comparing position information of one or more transmitting radios transmitting the one or more signals with position information of the wireless platform.

7. The method of claim 1, wherein the one or more signals comprise signals received from at least three transmitting radios that are non-coplanar with the wireless platform.

8. The method of claim 1, wherein estimating the direction of arrival comprises comparing phases of the one or more signals.

9. An apparatus for wireless communications, comprising:
one or more gyroscopes mounted on the apparatus and configured to measure one or more rotational body rates of the apparatus;
an estimator configured to estimate at least one direction of arrival of one or more signals;
at least one accelerometer configured to measure acceleration data; and
a Kalman filter configured to filter the rotational body rates, the direction of arrival, and the acceleration data to calculate attitude information of the apparatus.

10. The apparatus of claim 9, wherein the attitude information comprises at least one of: a heading, a pitch, or a roll of the apparatus.

11. The apparatus of claim 9, wherein the processor is also configured to integrate the rotational body rates over time to determine changes in the attitude information.

12. The apparatus of claim 9, wherein the estimator is also configured to compare position information of one or more transmitting radios transmitting the one or more signals with position information of the apparatus.

13. The apparatus of claim 9, wherein the one or more signals comprise signals received from at least three transmitting radios that are non-coplanar with the apparatus.

14. The apparatus of claim 9, wherein the estimator is also configured to compare phases of the one or more signals.

15. An apparatus for wireless communications, comprising:
means for measuring, with one or more gyroscopes, one or more rotational body rates of the apparatus;
means for estimating a direction of arrival of one or more signals received at the apparatus;
means for calculating attitude information based on the measured rotational body rates and the direction of arrival of the one or more signals;
means for measuring acceleration data for the apparatus; and
means for processing the measured rotational body rates, the direction of arrival, and the acceleration data.

16. The apparatus of claim 15, wherein the attitude information comprises at least one of: a heading, a pitch, or a roll of the apparatus.

17. The apparatus of claim 15, wherein the means for measuring, the acceleration data comprises one or more accelerometers, and wherein the means for processing comprises a Kalman filter.

18. The apparatus of claim 15, wherein the means for calculating the attitude information comprises:
means for obtaining a first attitude estimate based on the rotational body rates;
means for obtaining a second attitude estimate based on the direction of arrival;
means for comparing the first attitude estimate with the second attitude estimate to estimate a gyroscope error; and
means for combining the gyroscope error with a third attitude estimate to obtain the attitude information.

19. The apparatus of claim 15, further comprising:
means for integrating the rotational body rates over time to determine changes in the attitude information.

20. The apparatus of claim 15, wherein the means for estimating the direction of arrival comprises:
means for comparing position information of one or more transmitting radios transmitting the one or more signals with position information of the apparatus.

21. The apparatus of claim 15, wherein the one or more signals comprise signals received from at least three transmitting radios that are non-coplanar with the apparatus.

22. The apparatus of claim 15, wherein the means for estimating the direction of arrival comprises means for comparing, phases of the one or more signals.

23. A computer-program storage apparatus for determining attitude information about a wireless platform comprising a memory unit having one or more software modules stored thereon, the one or more software modules being executable by one or more processors and the one or more software modules comprising:
code for measuring, with one or more gyroscopes, one or more rotational body rates of the wireless platform;
code for estimating a direction of arrival of one or more signals received at the wireless platform;
code for obtaining a first attitude estimate based on the measured rotational body rates;
code for obtaining a second attitude estimate based on the direction of arrival;
code for comparing the first attitude estimate with the second attitude estimate to estimate a gyroscope error; and
code for combining the gyroscope error with a third attitude estimate to obtain the attitude information.

24. The computer-program storage apparatus of claim 23, wherein the attitude information comprises at least one of: a heading, a pitch, or a roll of the wireless platform.

25. The computer-program storage apparatus of claim 23, wherein the one or more software modules further comprise:
code for integrating the rotational body rates over time to determine changes in the attitude information.

26. The computer-program storage apparatus of claim 23; wherein the code for estimating the direction of arrival comprises:
code for comparing position information of one or more transmitting radios transmitting the one or more signals with position information of the wireless platform.

27. The computer-program storage apparatus of claim 23, wherein the one or more signals comprise signals received from at least three transmitting radios that are non-coplanar with the wireless platform.

28. The computer-program storage apparatus of claim 23, wherein the code for estimating the direction of arrival comprises code for comparing phases of the one or more signals.

* * * * *